April 13, 1926.                     1,580,499
J. KRUTTSCHNITT
VALVE CONTROL MECHANISM
Filed May 13, 1925          2 Sheets-Sheet 1

INVENTOR.
John Kruttschnitt
ATTORNEY.

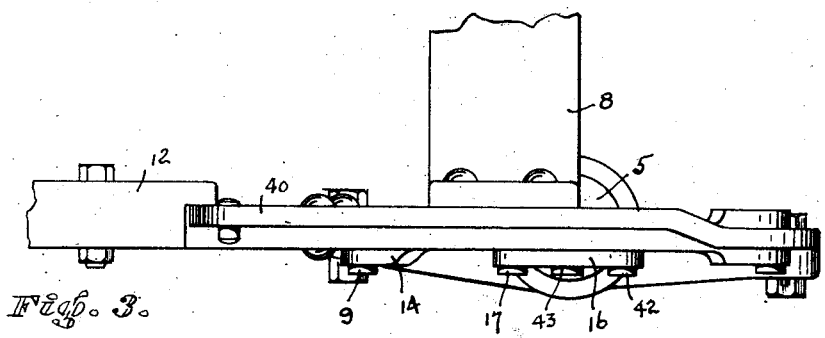
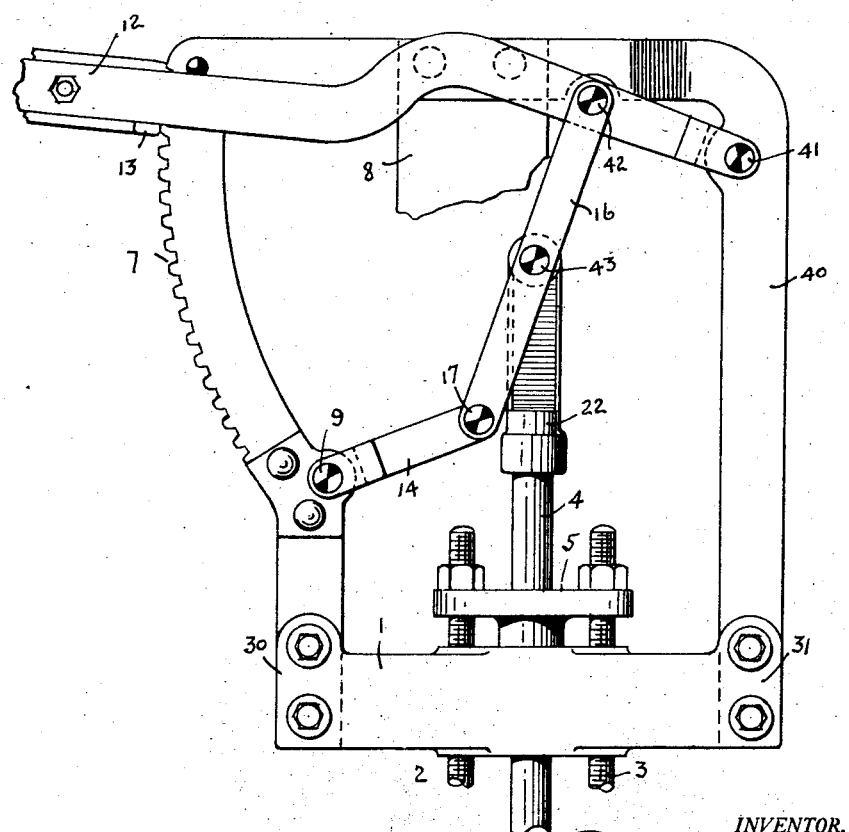

Patented Apr. 13, 1926.

1,580,499

UNITED STATES PATENT OFFICE.

JOHN KRUTTSCHNITT, OF SAN FRANCISCO, CALIFORNIA.

VALVE-CONTROL MECHANISM.

Application filed May 13, 1925. Serial No. 29,880.

*To all whom it may concern:*

Be it known that I, JOHN KRUTTSCHNITT, a citizen of the United States, residing at San Francisco, county of San Francisco, State of California, have invented new and useful Improvements in Valve-Control Mechanism, of which the following is a specification.

My invention has for its object means and mechanism for operating valves and is particularly adapted to the operation of locomotive and other steam engine throttle valves.

By employing my invention all side strains on the valve rod, the packing or the gland or other valve rod bearings is avoided and a straight line motion is effected, making it easier for the operator to open or close the valve.

By referring to the accompanying drawings my invention will be made clear.

Fig. 3 is an end view and Fig. 4 a side view similar to Figs. 1 and 2 respectively, except that they show a specific form of my invention.

Throughout the figures like numerals refer to identical parts.

Figure 1:
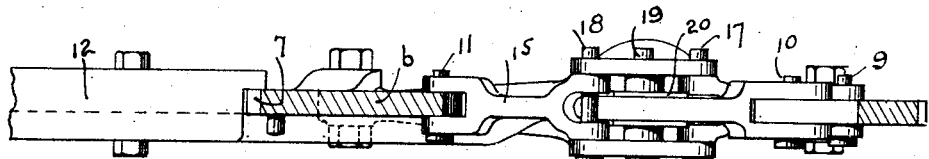
Fig. 1 is a cross section of Fig. 2 on the line I—I thereof.

The numeral 1 indicates a cross member or yoke adapted to be rigidly attached to the throttle valve stuffing box of a conventional locomotive as by the gland studs 2, 3, respectively. A valve operating rod is shown at 4 and a conventional packing gland at 5. A frame member 6 is secured to the cross member 1 and carries a quadrant 7 on one side, the whole being supported preferably from the back head of the boiler, as shown particularly at 8 Figs. 3 and 4.

At 9, 10 and 11 fulcrum points are provided on the frame for the links and levers mentioned below. A hand operating lever is shown at 12 having a conventional pawl or latch 13 which is to be provided with hand operating mechanism, not shown, but such as is commonly used.

A pair of links are indicated at 14, 15, of equal length and pivoted at 9 and 11 respectively. To the opposite ends of these links the floating link 16 is pivoted as shown at 17, 18, and in the center of the floating link is the pin 19 engaging the slide block 20. This block 20 is free to slide within the lever 12 but held against lateral displacement in the slot 21. Swiveled on the pin 19 is also the head 22 fixed on the valve stem 4. The valve stem 4 actuates any conventional form of steam valve, well known but not shown.

The operation is as follows. When the lever 12 is shifted by the operator into any of the desired positions on the quadrant 7 it may be held in place by the latch 13 engaging the quadrant teeth and its movement carries with it the block 20 which is free to slide in the slot 21, and this causes a movement of the pin 19 and therefore a movement of the link 16 and the pivots 17, 18, these latter two pivots being constrained to swing in arcs about the link pivots 9, 11 respectively, and if these arcs are of equal radius and the pin 19 is in or near the center of link 16, the movement of 19 and of the valve stem 4 will be in a straight line. It will therefore be seen that the links 14, 15, and the floating link 16 compel the straight line movement of the stem 4 and all side pressure against the gland 5 or the stuffing box packing will be precluded.

In the form of my invention specifically shown in Figs. 3 and 4, the frame member 40 carries the pivot 41 on which the hand lever 12 is adapted to swing, and carries therewith the pivot 42 and floating link 16. The other end of this link is constrained to move about the pivot 9 by the link 14 and pivot 17. This combination causes the pin 43 to travel in a straight line, carrying with it the head 22 and valve stem 4.

Figure 2:
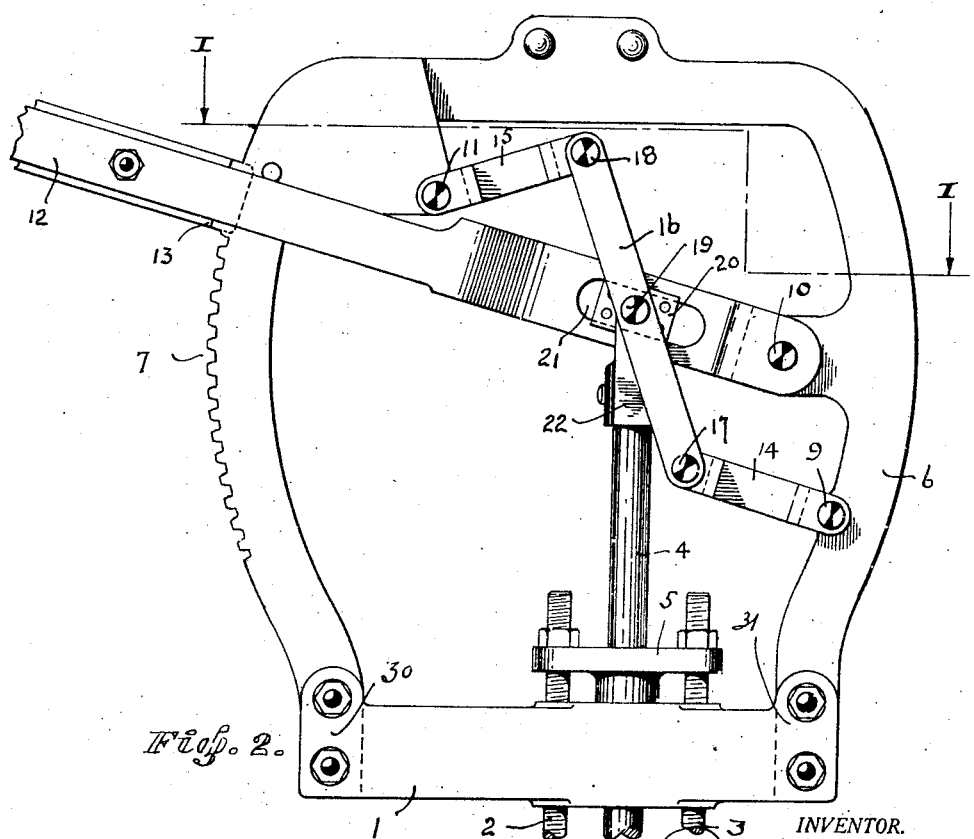
Fig. 2 is a plan view of my invention as applied to the throttle valve of a locomotive.

It will be seen from Fig. 2 that the shape of the frame is such as to secure a rigid supporting structure for the moving parts and I prefer to make the frame of a C-shaped portion 6 connected by bolts at its ends 30, 31, to the cross piece 1 or an equivalent rigid portion of the valve stuffing box which carries also the valve-rod gland or bearing, or to the back head of the boiler.

I claim:

1. Valve control mechanism comprising a rod adapted to be connected to a valve, a frame having a bearing for said rod, an operating lever of the second order pivoted to said frame and means for locking said lever in any of its adjusted positions, a block constrained to move with but free to slide with respect to said lever a floating link, a pair of links each pivoted at one end to said frame and at the other end to opposite ends of a floating link and a pivot between the ends of said floating link and engaging said block and said rod.

2. Mechanism as set forth in claim 1 wherein said first named links are of equal length and wherein the floating link is pivoted to the block midway between its end pivots and wherein said frame comprises a C-shaped member and a cross member connecting the ends of the C and wherein the bearing for the rod is in the cross member.

JOHN KRUTTSCHNITT.